Patented Nov. 18, 1941

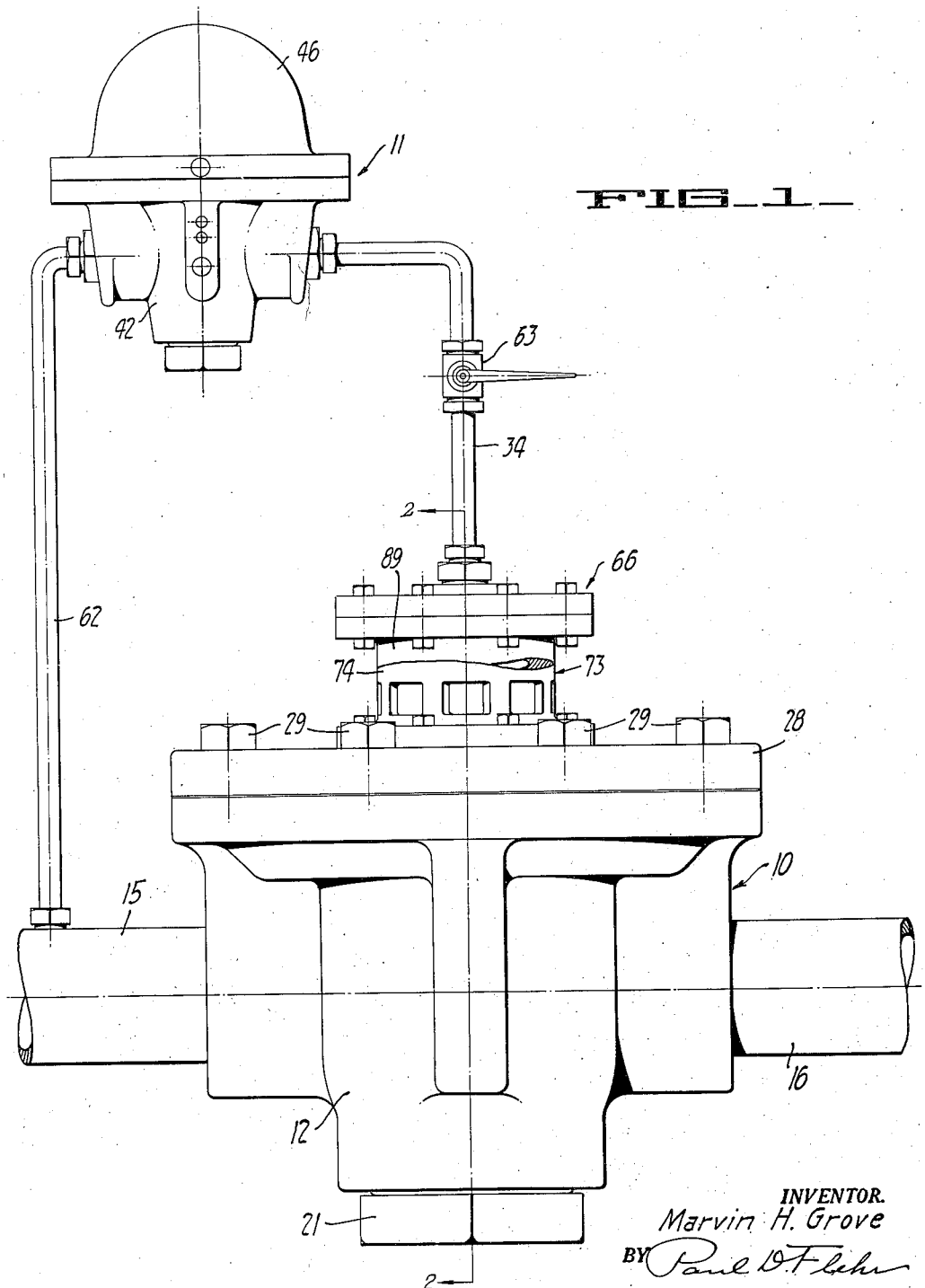

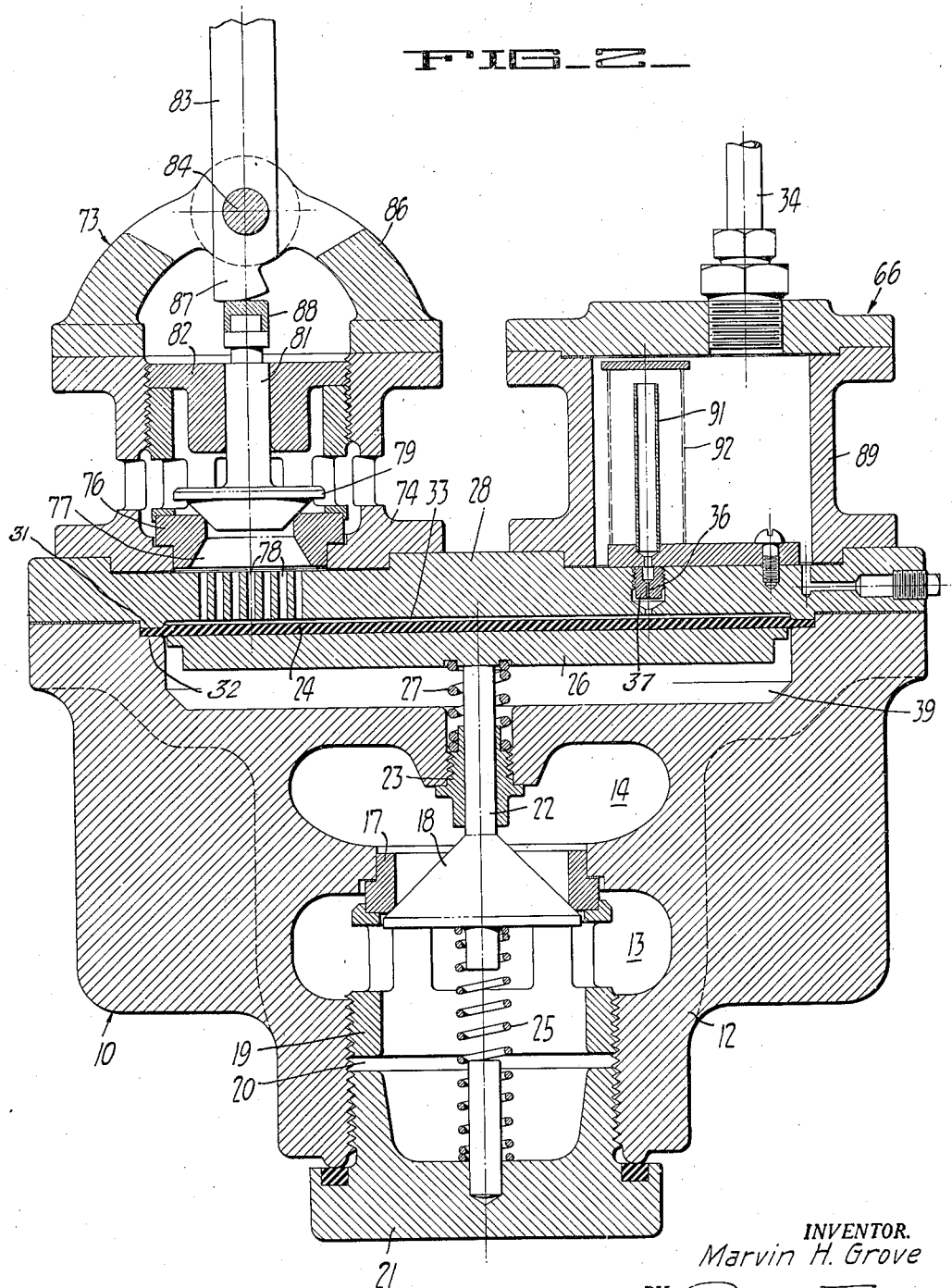

2,262,999

UNITED STATES PATENT OFFICE 2,262,999

FLUID FLOW CONTROL APPARATUS

Marvin H. Grove, Berkeley, Calif.

Application December 19, 1938, Serial No. 246,654

3 Claims. (Cl. 50—11)

This invention relates generally to apparatus for automatically controlling the flow of various fluids. More particularly it relates to apparatus of the type capable of relatively high capacities, with either semi-automatic or full automatic operation.

In the past it has been common to make use of so-called double valve arrangements, incorporating both a pilot valve and a fluid operated main valve, for the purpose of securing a desired control of fluid flow. In the majority of such instances the one valve mechanism, termed the pilot mechanism, operates in response to varying pressures upon the outflow side to apply varying pressures to a piston or diaphragm, which in turn operates the main valve member. One difficulty with such prior apparatus is that they tend to become complicated when made to handle relatively large rates of fluid flow, and to be unreliable as the differential between the inflow and outflow pressure increases. Another difficulty with such prior apparatus is that it cannot be used where quick closing operation is required.

It is an object of the invention to provide a valve capable of opening to relieve a relatively high pressure fluid head, without chattering of the valve member against its seat, and which at the same time can be abruptly moved to closed position.

Further objects of the invention will appear from the following description in which a preferred embodiment of the invention has been set forth in detail in conjunction with the accompanying drawings.

Referring to the drawings:

Fig. 1 is a side elevational view of a modified form of apparatus.

Fig. 2 is a cross-sectional detail on an enlarged scale, taken along the line 2—2 of Fig. 1.

The apparatus as illustrated in the drawings makes use of a valve mechanism operated by application of fluid pressure, together with a pressure regulator for supplying the fluid pressure either continuously for sustained automatic operation, or intermittently as supervised by an operator. Thus the apparatus makes use of the fluid pressure operated mechanism 10, in conjunction with the fluid pressure regulator 11. Mechanism 10 makes use of a diaphragm or like fluid pressure operated member in conjunction with a movable valve, whereby upon varying the pressure applied to the same, the valve is moved between open and closed positions. The loading of regulator 11 is preferably adjusted in order that the discharge pressure may be adjusted or limited as desired. In this connection I prefer to make use of a regulator of the type disclosed and claimed in my Patent No. 2,047,101, and co-pending application Serial No. 114,406, filed Dec. 5, 1936, now Patent No. 2,212,709. Such regulators are free of chattering or slapping of the valve member upon its seat, and are capable of accurate and reliable operation over a wide variety of fluid pressures.

The particular type of fluid operated valve mechanism 10 illustrated is similar to that disclosed and claimed in my co-pending application Serial No. 227,243, filed August 29, 1938. Thus in this instance the mechanism consists of a valve body 12, provided with inlet and outlet passages 13 and 14. The pipe 15 connected to inlet 13, is presumed to connect with a source of fluid under pressure, which is being delivered to the outlet piping 16. Mounted within the body there is a valve seat formed by the ring 17, which cooperates with the valve member 18. Seat ring 17 is shown retained in place by a ported sleeve 19, and this sleeve is threaded within the lower body opening 20. Normally the opening 20 is closed by the threaded plug 21.

The valve member 18 is secured to the stem 22, and this stem is guided within the fixed bushing 23. As a suitable fluid pressure operated member I make use of a flexible diaphragm 24, the lower side of which is engaged by the rigid circular diaphragm plate 26. The central portion of this plate engages the upper end of stem 22, and the plate is normally urged upwardly by the light compression spring 27. Valve member 18 is also normally urged upwardly by the light compression spring 25.

A rigid plate 28 is secured to the upper side of the body 12, as by means of bolts or screws 29. Opposed annular shoulders or surfaces 31 and 32 are formed on the plate 28 and upper face of body 12 respectively, and serve to grip the peripheral edge portion of diaphragm 24, thus providing an effective seal. Assuming a position of the diaphragm 24 corresponding to closed position of the valve member 18, as shown in Fig. 1, there is a relatively confined fluid space 33 between the underside of plate 28, and the upper surface of the diaphragm 24. For example with the diaphragm having an effective diameter of the order of 7¾ inches, the height of space 33 can be of the order of $\frac{1}{32}$ inch. As will be presently explained the use of such a confined space in conjunction with a restricted orifice communicating with this space, serves to prevent chattering of the valve member against its seat.

A tube or pipe 34 is shown having its one end attached to plate 28, and fluid communication between this pipe and the restricted space 33, is through the relatively small orifice 36, in the fitting 37. When using dimensions such as previously cited by way of example, the orifice 36 can be of the order of 1/32 of an inch in diameter.

The space underlying the diaphragm plate 26, accommodates downward movement of the diaphragm 24 to move the valve member 18 to its open position. A suitable duct (not shown) serves to connect this space to the outlet passage 14. The amplitude of movement of the diaphragm for moving the valve member between closed and full open positions, will depend upon the effective opening through the seat ring 17. For example with an opening through the seat ring of two inches in diameter, the total travel of the valve member will be in the neighborhood of from 1/2 to 5/8 of an inch.

As stated above, the type of regulator 11 illustrated is fully disclosed in said patent, 2,212,709.

In operating a gas loaded regulator of this type, a predetermined amount of gas under pressure is admitted to the chamber in the dome 46, and the pressure of this gas forms a loading force upon the diaphragm mounted therein. For the purpose of admitting or venting gas from dome 46, an arrangement of manually operated valves can be employed, as disclosed in said Patent No. 2,047,101. A pipe 62 is shown connecting the inlet passage of regulator 11 with a source of fluid under pressure, which is preferably the same fluid source connected to mechanism 10, namely the pipe 15. The outlet passage of the regulator is connected to pipe 34 having a manual control valve 63 therein.

Means is provided to make possible rapid closing movement of the valve member 18 and for this purpose a venting valve is associated therewith. Thus referring to Fig. 2 the plate 28 overlying the diaphragm 24, serves as a mounting for the venting valve means 73. The representative means illustrated consists of a ported casing 74, the lower end of which is seated upon the plate 28. A valve seating ring 76 is carried within casing 74, and the passage or opening 77 through this ring is in communication with the restricted space 33, through a plurality of ducts 78. A valve member 79 cooperates with seat ring 76, and is carried by the stem 81. A guide bushing 82 is carried by the upper part of casing 74, and accommodates stem 81. It will be evident that as long as stem 81 is held down, the valve 79 is maintained closed and there can be no unrestricted venting of space 33. However, when stem 81 is released, fluid pressure can force valve member 79 upwardly to open position, thus permitting abrupt and unrestricted venting of space 33 through ducts 78.

A variety of expedients can be utilized for releasably retaining the valve member 79 in closed position. For example I have shown a hand lever 83, having a pivotal connection 84 to the yoke 86. The cam-like end portion 87 on lever 83 is adapted to engage a cap 88, on the upper end of stem 81. For the position of handle 83 illustrated in Fig. 3, the valve 79 is held in closed position. However, when lever 83 is swung in a clockwise direction the cam portion 87 is disengaged thus permitting the valve member 79 to be forced upwardly to open position by fluid pressure.

A filter 66 is provided between pipe 34 and the regulator 11. Thus the filter makes use of a closed casing 89, the lower end of which is clamped upon the plate 28. Pipe 34 connects with casing 89, and with the discharge side of the regulator 11. The restricted orifice 36 connects with the restricted space 33 and to minimize the possibility of foreign particles clogging this orifice, it is shown communicating with an upstanding tube 91 within casing 89. Surrounding tube 91 there is a screen 92, and the space about the screen 92 can be filled with some suitable filtering medium.

In utilizing the embodiment illustrated one can set the regulator 11 to deliver a discharge pressure such as will move the valve member 18 to full open position, upon opening valve 63. The valve 18 will then remain open until one trips the hand lever 83, to cause venting from the space 33, with abrupt closing movement of valve member 18. Thereafter upon closing valve member 63, valve member 79 drops back to full closed position, to enable re-setting of lever 83.

The device described herein can be utilized where one desires provision for abrupt emergency closing of the valve member 18, or where it is desired to abruptly close the valve 18 after an opening movement of the same.

I claim:

1. In fluid flow control apparatus, a body having inlet and outlet passages, a valve seat formed within the body, a valve member cooperating with the valve seat and movable between open and closed positions, a flexible diaphragm carried by the body and cooperatively connected with the valve member, means forming a substantially rigid wall extending in proximity with one side of the diaphragm to form a confined fluid space, orifice means serving to establish restricted communication between said confined space and a source of fluid under pressure, fluid pressure applied to said confined space through said orifice means serving to move the valve member from closed towards open positions, a fluid pressure regulator of the type adapted to maintain a substantially constant discharge pressure irrespective of varying inlet pressure supplied to the same, means forming a connection between the discharge side of said regulator and said orifice means, and valve means having unrestricted communication with said confined space and serving to permit unrestricted venting of the same, to enable quick closing movement of the first named valve member.

2. In fluid pressure regulating apparatus, a body provided with inlet and outlet passages, a valve seat formed in the body, a valve member cooperating with the valve seat and movable in opposite directions between open and closed position, a flexible diaphragm carried by the body and operatively connected to the valve member, means forming a substantially rigid wall extending across one side of the diaphragm and serving to form a confined fluid space between said wall and the diaphragm, a restricted orifice serving to establish communication between said space and a source of fluid under pressure, a venting valve member movable between open and closed positions, a valve seat for said venting valve member mounted on said wall and in relatively close proximity to the diaphragm, the opening through said valve seat being relatively unrestricted, the inlet side of said seat being in direct unrestricted communication with said confined space and the outlet side of the seat being adapted for unrestricted discharge of vented fluid, and means for retaining said venting valve in closed position upon said seat and for effecting rapid opening movement of the same.

3. In fluid flow control apparatus, a body having inlet and outlet passages, a valve seat formed within the body, a valve member cooperating with the valve seat and movable between open and closed position, a flexible diaphragm carried by the body and cooperatively connected with the valve member, means forming a substantially rigid wall extending in proximity with one side of the diaphragm to form a confined fluid space, orifice means serving to establish restricted communication between said confined space and a source of fluid under pressure, fluid pressure applied to said confined space through said orifice means serving to move the valve member from closed to an open position, a fluid pressure regulator of the type adapted to maintain a substantially constant discharge pressure irrespective of varying inlet pressures supplied to the same, means forming a connection between the discharge side of said regulator and said orifice means, a venting valve member movable between open and closed positions, a valve seat for said venting valve member mounted on said wall and in relatively close proximity to the diaphragm, the opening through said valve seat being relatively unrestricted, the inlet side of said seat being in direct unrestricted communication with said confined space and the outlet side of the seat being adapted for unrestricted discharge of vented fluid, and means for retaining said venting valve in closed position upon its seat and for effecting rapid opening movement of the same.

MARVIN H. GROVE.